(12) United States Patent
Chang (10) Patent No.: US 6,710,898 B2
(45) Date of Patent: Mar. 23, 2004

(54) MODULAR SCANNER

(75) Inventor: Martin Chang, Hsinchu (TW)

(73) Assignee: Avision Inc., Hsin-Chu Hsien (TW)

( * ) Notice: Subject to any disclaimer, the term of this patent is extended or adjusted under 35 U.S.C. 154(b) by 337 days.

(21) Appl. No.: 09/682,220

(22) Filed: Aug. 8, 2001

(65) Prior Publication Data

US 2002/0041403 A1 Apr. 11, 2002

(30) Foreign Application Priority Data

Oct. 5, 2000 (TW) ...................................... 89217281 U (51) Int. Cl.7 ................................................ H04N 1/04
(52) U.S. Cl. ....................... 358/474; 358/497; 358/494; 358/471
(58) Field of Search ................................ 358/471, 474, 358/400, 468, 500, 505, 506, 487, 497, 296, 494, 401, 501; 382/313, 312, 318, 319; 250/208.1, 234–236; 361/686; 399/211; 359/196

(56) References Cited

U.S. PATENT DOCUMENTS 5,993,093 A * 11/1999 Schoennauer et al. ...... 400/621
6,002,508 A * 12/1999 Mai ............................ 358/497
6,285,483 B1 * 9/2001 Shia et al.

* cited by examiner

Primary Examiner—Cheukfan Lee
(74) Attorney, Agent, or Firm—Winston Hsu (57) ABSTRACT

7A modular scanner has a housing with a transparent platform upon which a document may be placed. A first control board for controlling operations of the scanner is disposed within the housing. A scanning module is also installed inside the housing and is electrically connected to the first control board. The scanning module is used to scan a document placed on the transparent platform to generate corresponding image data. A first input device is disposed on the housing to provide an input interface. The first control board is removably installed inside the housing, and the first input device is removably connected to the housing. The first control board and the first input device are capable of being replaced, respectively, with a second control board and a second input device.

16 Claims, 10 Drawing Sheets

MODULAR SCANNER

BACKGROUND OF INVENTION

1. Field of Invention

The present invention relates to a scanner and, in particular, to a modular scanner.

2. Description of the Prior Art

Desktop scanners are very popular computer peripheral devices. They are used to scan documents to generate corresponding image data. In addition, scanners can provide extra functionality. For example, a scanner may be used to send image data as fax image data to other facsimile devices through a phone line, or to other people in an e-mail format through a network, or to a printer for copying. The functions and hardware specifications provided by such scanners are set by the manufacturer and cannot be modified. If one wants to update the functionality of the scanner, it is usually done by updating and/or adding computer software, or sending the scanner back to the manufacturer to replace components.

On the other hand, when a manufacturer makes a scanner, there are usually different modules for different models with different functions. Each model has a specific module so as to ensure that each device in the scanner operates normally after assembly. However, as there are increasing numbers of models, more modules are needed, and each module has an additional cost burden. Moreover, in order to ensure that the manufacturing process is consistent and error-free, the manufacturer usually requires that a certain amount of stock in modules be kept for each scanner housing. The more housings one has, the higher the costs of keeping sufficient amounts of modules in supply as stock.

SUMMARY OF INVENTION

It is therefore a primary objective of the present invention to provide a modular scanner that allows direct replacement of the control board and input faceplate of the scanner when the manufacturer or user wants to change the functionality of the scanner, without requiring modification of any other elements of the scanner.

Briefly summarized, the present invention discloses a modular scanner. The modular scanner has a housing with a transparent platform upon which a document may be placed. A first control board for controlling operations of the scanner is disposed within the housing. A scanning module is also installed inside the housing and is electrically connected to the first control board. The scanning module is used to scan a document placed on the transparent platform to generate corresponding image data. A first input device is disposed on the housing to provide an input interface. The first control board is removably installed inside the housing, and the first input device is removably connected to the housing. The first control board and the first input device are capable of being replaced, respectively, with a second control board and a second input device.

It is an advantage of the modular scanner in that it allows convenience of assembly so that the scanner manufacturer can greatly reduce production line modifications when making various models of scanners. The manufacturing management is thus made much simpler. Additionally, by modularizing the scanner, stocking overhead costs can be reduced.

These and other objectives and advantages of the present invention will no doubt become obvious to those of ordinary skill in the art after reading the following detailed description of the preferred embodiment that is illustrated in the various figures and drawings.

DETAILED DESCRIPTION

Figure 1:
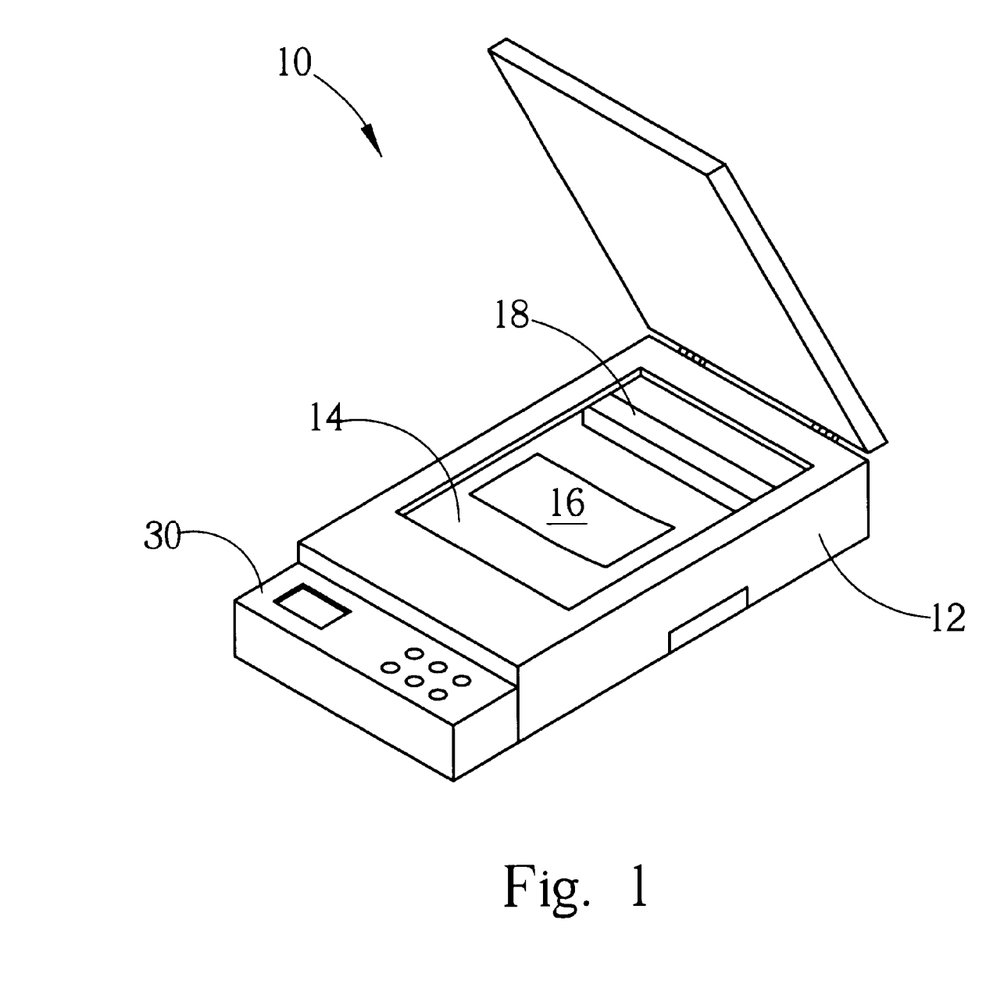
FIG. 1 is a view of a scanner according to the present invention.
Figure 2:
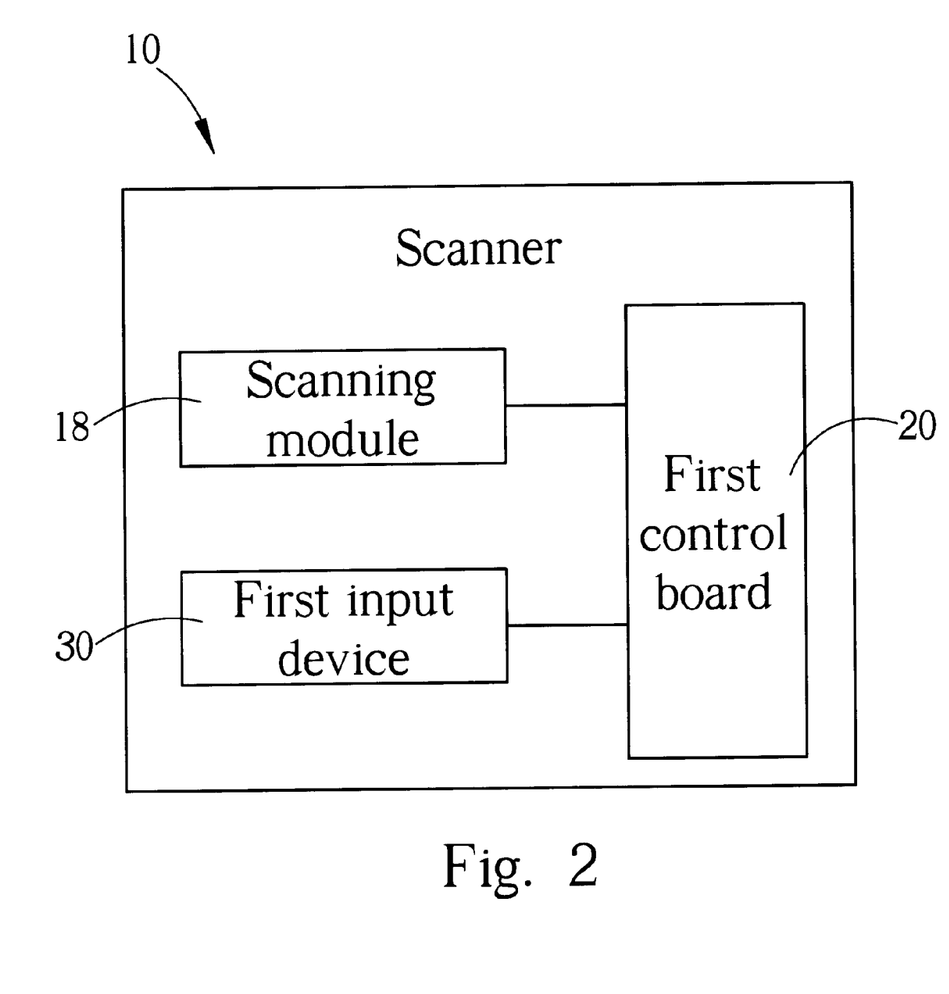
FIG. 2 is a functional block diagram of the scanner in FIG. 1.

With reference to FIGS. 1 and 2, a scanner 10 includes a housing 12, a first control board 20 for controlling operations of the scanner 10, a scanning module 18 installed inside the housing 12 and electrically connected to the first control board 20, and a first input device 30 electrically connected to the first control board 20 for providing a user input interface to control the scanner 10. As shown in FIG. 1, the housing 12 is installed with a transparent platform 14 onto which a document 16 to be scanned is placed. The scanning module 18 scans the document 16 to generate corresponding image signals.

Figure 3:
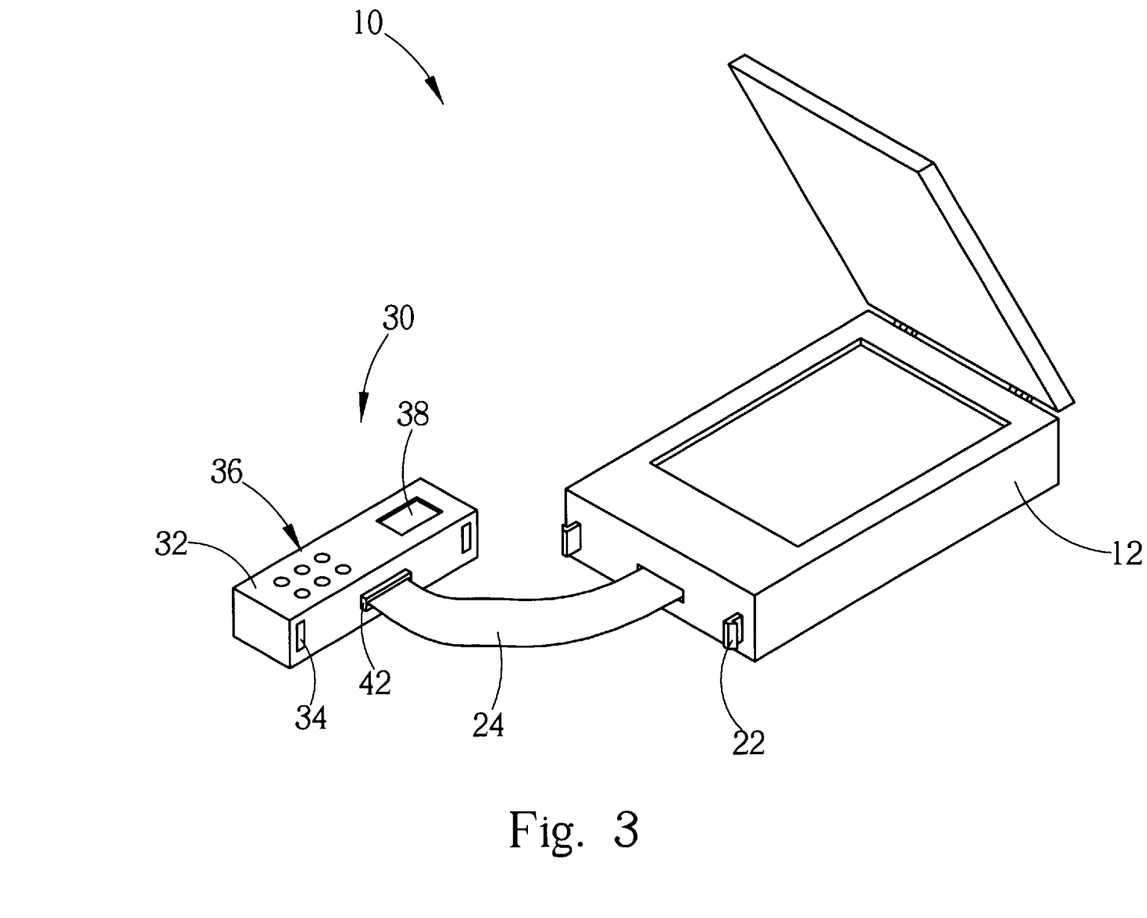
FIG. 3 is a schematic view of the composition elements in the scanner in FIG. 1.

With reference to FIG. 3, it is shown how to assemble the scanner 10 and the first input device 30. The scanner 10 has a first connector 22 located on one side of the housing 12 for connecting to the first input device 30. The first input device 30 has a shell 32, several buttons 36 to enable a user to provide input control signals, a display 38 for displaying information about the scanner 10, and a second connector 34 located on the shell 32 of the first input device 30. The display device 38 is a liquid crystal display (LCD) for showing current operation information, error information, and warning signals for the scanner 10. The second connector 34 connects to the first connector 22 so that the first input device 30 can be removably installed onto the side of the scanner housing 12.

As shown in FIG. 3, the first input device 30 further contains a signal outlet 42 electrically connected to one end of a transmission line 24. The first input device 30 transmits operation signals to the first control board 20 through the transmission line 24, and the first control board 20 will cause the scanner 10 to perform actions corresponding to the operation signals. The signal outlet 42 is a serial cable outlet, and the transmission line 24 is a serial cable.

Figure 4:
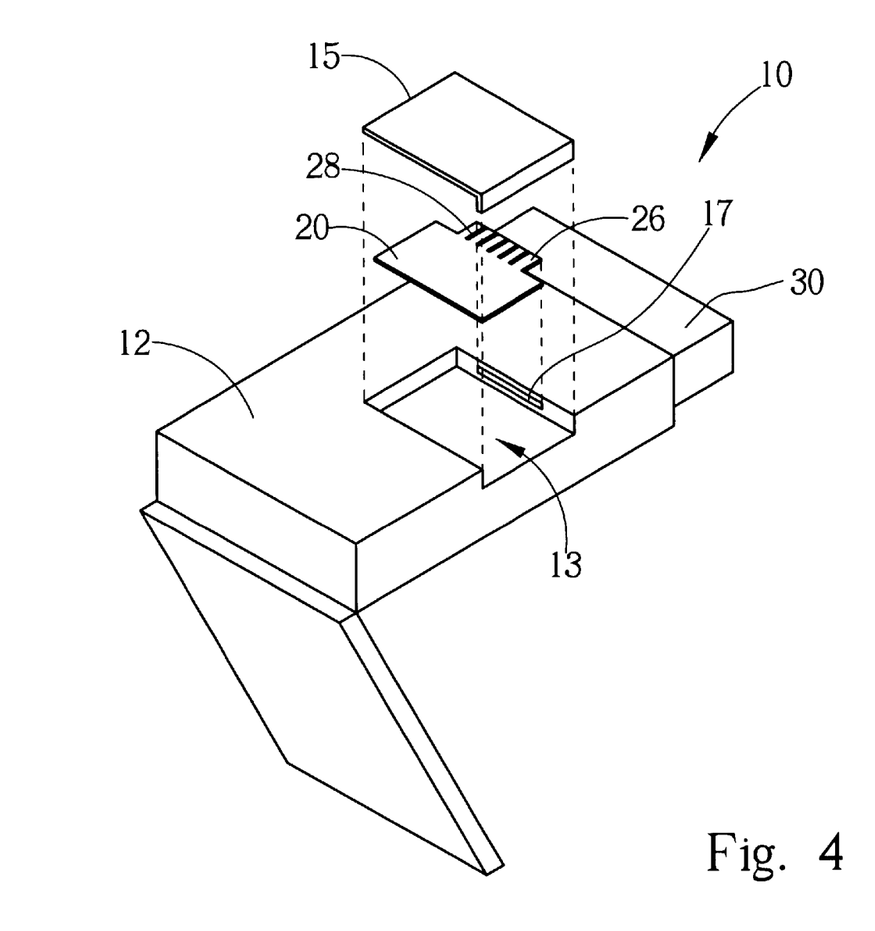
FIG. 4 is a bottom view of the composition elements in the scanner in FIG. 1.

Referring to FIG. 4, it is shown how the scanner 10 and the first control board 20 combine together. A sunken socket 13 is formed at the bottom of the scanner housing 12. The scanner 10 has a covering 15 for capping the sunken socket 13. The first control board 20 is removably installed between the covering 15 and the housing 12. The first control board 20 contains a first input/output (I/O) port 26 for electrical connection between the first control board 20 and the first input device 30, and the first control board 20 and the scanning module 18. The first I/O port 26 contains several pins 28 (the so-called golden fingers). The scanner 10 has a socket 17 in the sunken socket 13 of the housing 12 so that the first I/O port 26 can be inserted into the socket 17. The first I/O port 26 is a serial cable outlet electrically connected to a serial cable. The operations of the scanner 10 are controlled through this serial cable. When the user enters control signals to the scanner 10 through the first input device 30, the first control board 20 receives the signals entered by the user through the first I/O port 26 and thereby controls the scanning module 18. Moreover, the first control board 20 transmits various control messages to the first input device 30 through the first I/O port 26.

Figure 5:
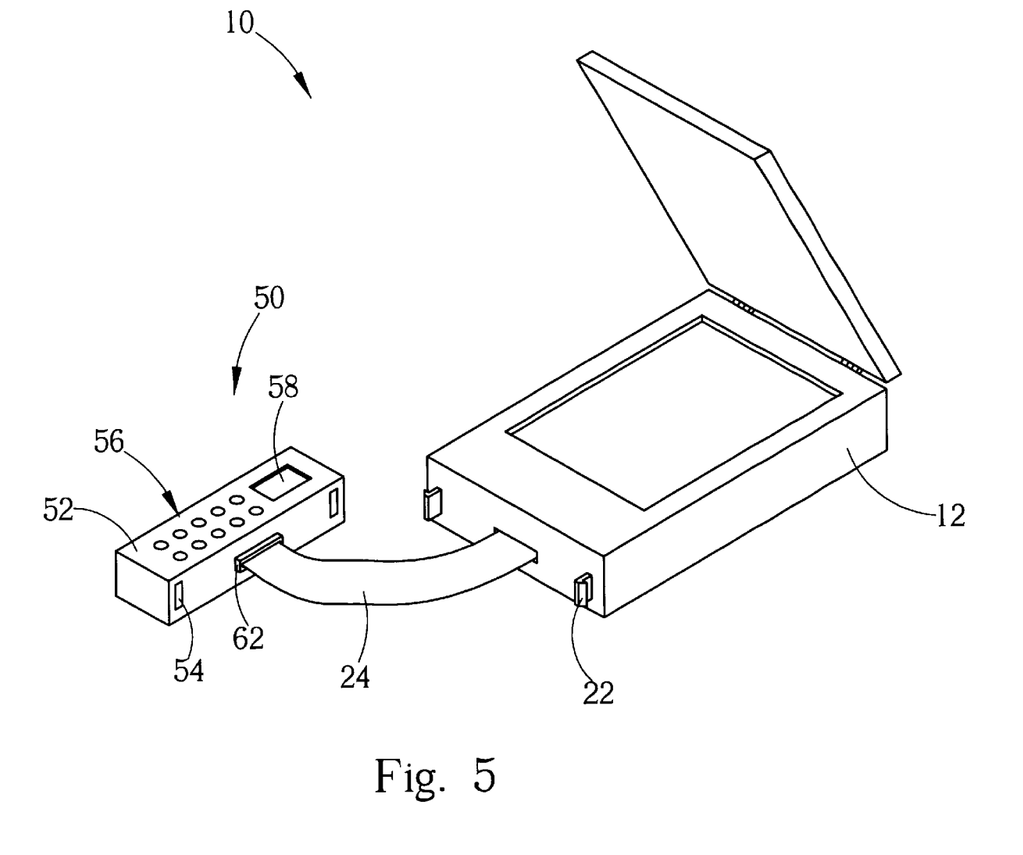
FIG. 5 is a schematic view showing a first control board and first input device of the scanner in FIG. 1 being replaced by a second control board and a second input device.
Figure 6:
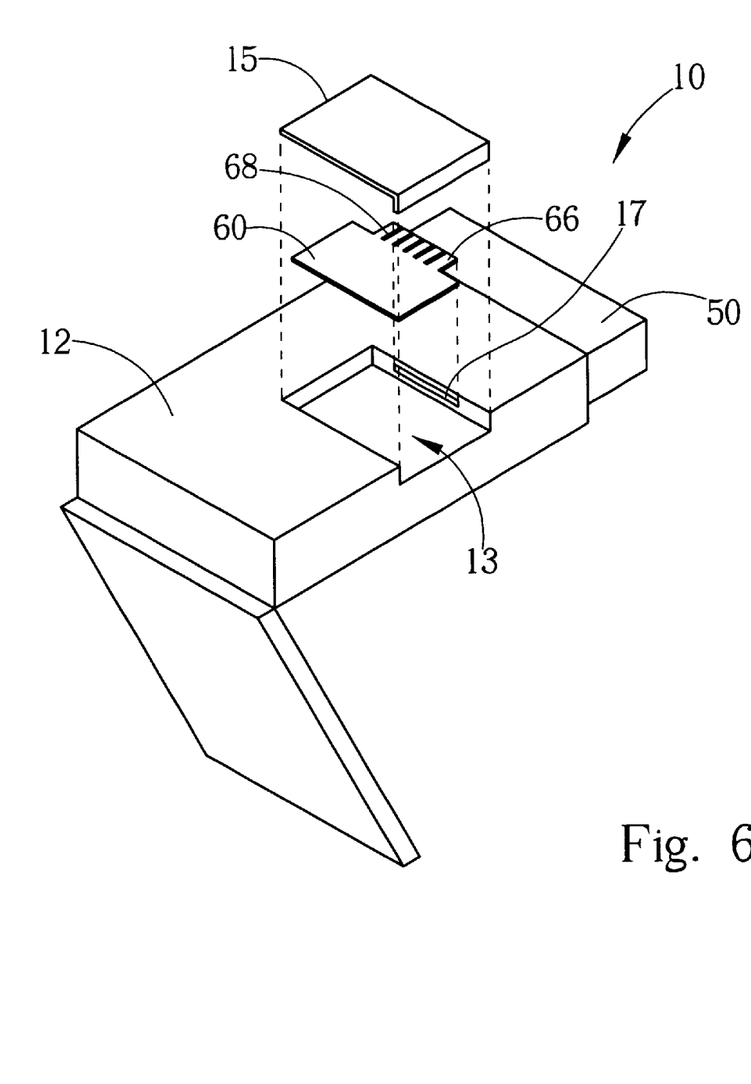
FIG. 6 is a bottom view of the composition elements of the scanner in FIG. 5.
Figure 7:
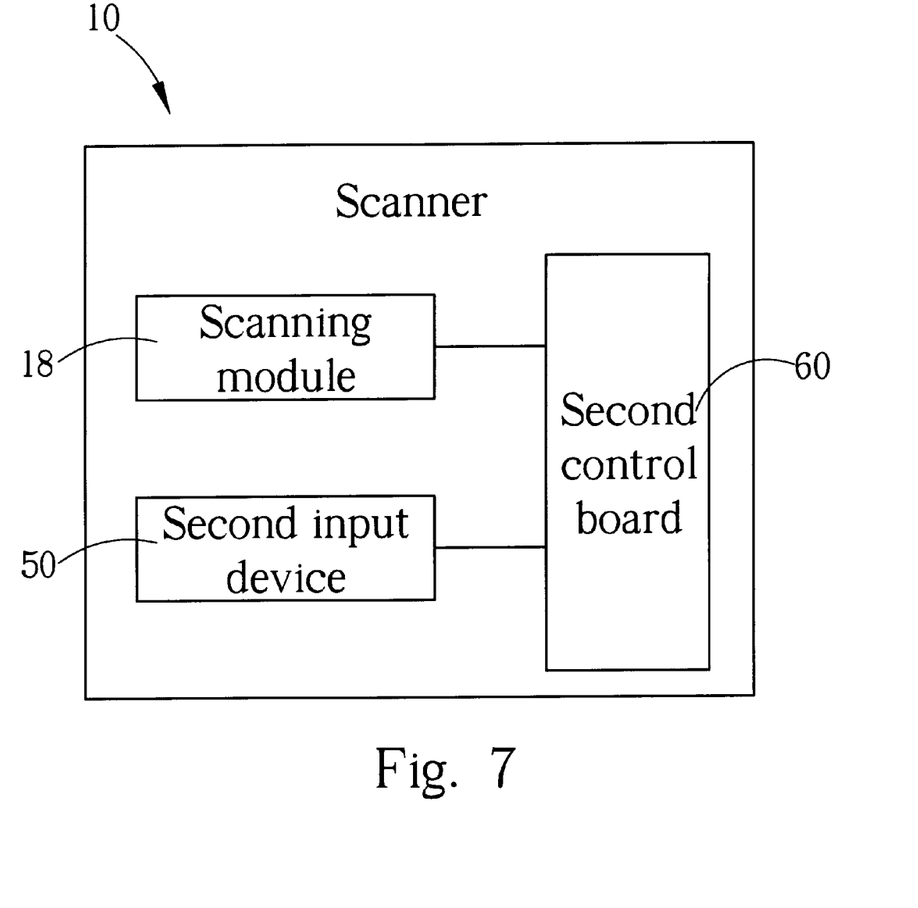
FIG. 7 is a functional block diagram of the scanner in FIG. 5.

With simultaneous reference to FIGS. 5 through 7, as described above, the first input device 30 and the first control board 20 of the scanner 10 are installed on the scanner 10 in such a way that they are removable, and thus replaceable. Therefore, the first control board 20 and the first input device 30 can be replaced by a second control board 60 and a second input device 50 so that the new scanner 10 has different functions. Functionality updating of the scanner 10 can be achieved by replacing the first input device 30 and the first control board 20. For example, the manufacturer can install a first input device 30 with the most basic functions and the corresponding first control board 20 on the scanner 10, making a scanner with the most basic functionality. The manufacturer can also choose to install a second input device 50 with more advanced functions and the corresponding second control board 60 on the scanner 10, making a scanner with advanced functionality. Similarly, the user can upgrade or replace the scanner he or she has in a similar way. Therefore, either the manufacturer or the user can readily upgrade or update the scanner 10.

The second input device 50 also has a shell 52, several buttons 56 for the user to enter control signals, a display 58 for displaying information about the scanner 10, and a second connector 54 installed on the shell 52 of the second input device 50. The display 58 is an LCD to display current operational information, error information, and warning signals about the scanner 10. The second connector 54 connects to the first connector 22 so that the second input device 50 can be removably installed on one side of the scanner housing 12. As shown in FIG. 5, the second input device 50 further contains an outlet 62 electrically connected to one end of a transmission line 24. The second input device 50 transmits operation signals to the second control board 60 through the transmission line 24. The second control board 60 will then make the scanner 10 to do the corresponding actions according to the operation information. The outlet 62 is a serial cable outlet, and the transmission line 24 is a serial cable.

As shown in FIG. 6, the second control board 60 contains a second I/O port 66 for providing electrical connection between the second control board 60 and the second input device 50, and the second control board 60 and the scanning module 18. The second I/O port 66 contains several pins 68 in the socket 17. The second I/O port 66 is a serial cable outlet that is electrically connected to a serial cable. The second control board 60 can then control the scanner 10 through the serial cable. When the user enters control signals to the scanner 10 through the second input device 50, the second control board 60 receives the control signals entered by the user through the second I/O port 66 and thereby controls the scanning module 18.

Figure 8:
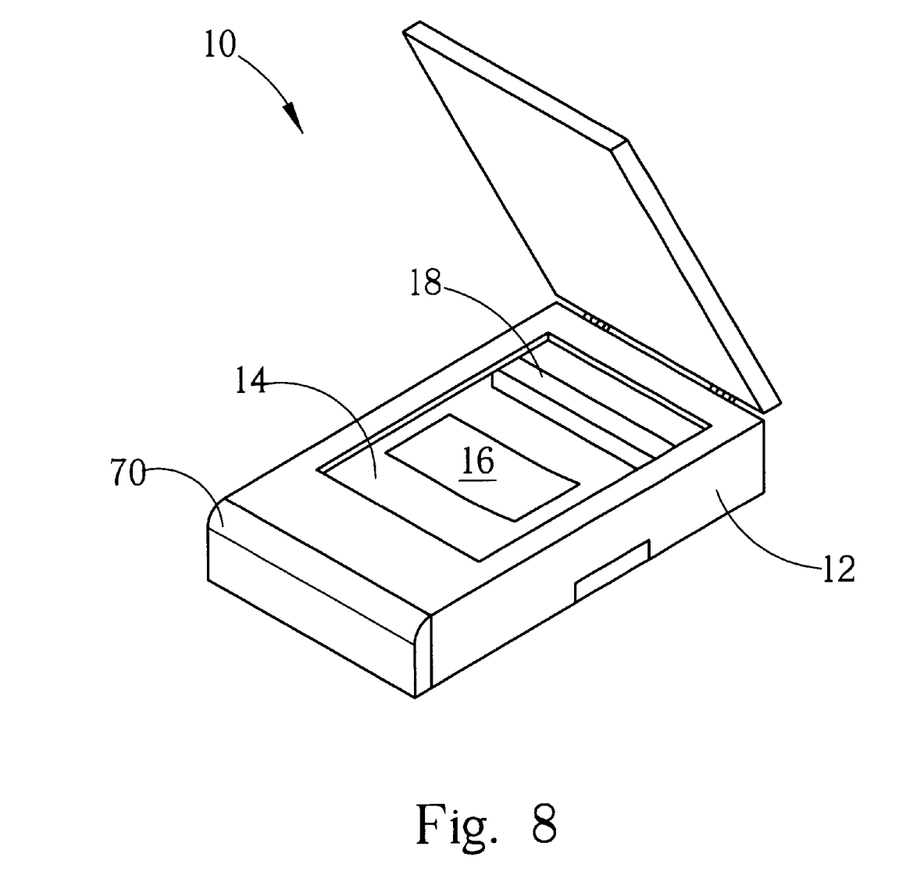
FIG. 8 is a schematic view showing a first control board and first input device of the scanner in FIG. 1 being replaced by a third control board and a protection faceplate.
Figure 9:
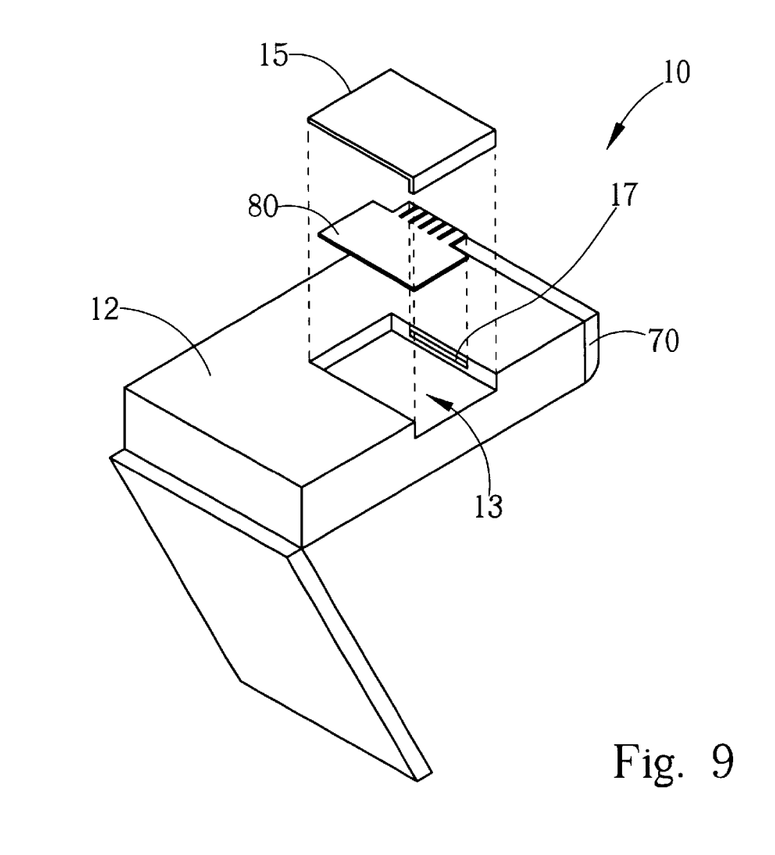
FIG. 9 is a bottom view of the composition elements of the scanner in FIG. 8.
Figure 10:
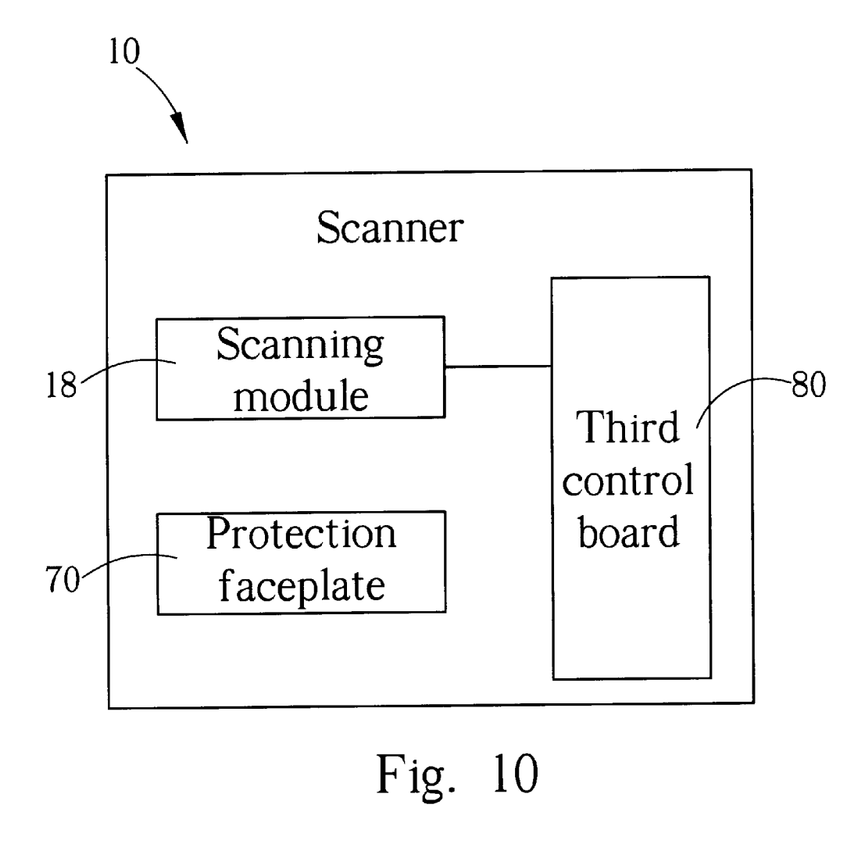
FIG. 10 is a functional block diagram of the scanner in FIG. 8.

With simultaneous reference to FIGS. 8 through 10, when the scanner 10, made by the manufacturer or used by the user, does not require the use of the first input device 30, the first connector 22 connects to a protection faceplate 70 without any input functionality, rather than connecting to the first input device 30. In this configuartion, the first control board 20 is replaced by a third control board 80 that can control the scanning module 18 to scan a document 16 and to generate the corresponding image data.

In contrast with the prior art scanner, the scanner 10 disclosed herein has modular functionality. The user can readily update or expand the functionality of the scanner 10 by replacing the first input device 30 and the corresponding first control board 20. The upgrade cost is much less than buying a whole new scanner. Moreover, the scanner manufacturer can use such modular scanners to effectively reduce stocking costs, and to increase the convenience in manufacturing management.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A modular scanner comprising:

a housing with a transparent platform upon which a document may be placed;

a first control board for controlling operations of the scanner;

a scanning module installed inside the housing and electrically connected to the first control board, the scanning module scanning the document placed on the transparent platform to generate corresponding image data; and a first input device disposed on the housing for providing an input interface;

wherein the first control board is removably installed inside the housing, and the first input device is removably connected to the housing, so that the first control board and the first input device are capable of being replaced, respectively, with a second control board and a second input device.

2. The scanner of claim 1 wherein the first control board and the first input device are capable of being replaced, respectively, with a third control board and a protection faceplate.

3. The scanner of claim 1 further comprising a first connector located on one side of the housing for connecting with the first input device or the second input device.

4. The scanner of claim 3 wherein both the first input device and the second input device comprise a second connector for connecting with the first connector.

5. The scanner of claim 1 wherein the housing comprises a sunken socket for accommodating the first control board or the second control board.

6. The scanner of claim 1 further comprising a transmission line, wherein both the first input device and the second input device comprise a first signal outlet electrically connected to the transmission line, so that the first input device is capable of being electrically connected to the first control board or that the second input device is capable of being electrically connected to the second control board.

7. The scanner of claim 6 wherein the transmission line is a serial cable, and the first signal outlet is a serial cable outlet.

8. The scanner of claim 1 wherein both the first input device and the second input device comprise at least one button used to control operations of the scanner.

9. The scanner of claim 1 wherein the first input device comprises a display for displaying information.

10. The scanner of claim 1 wherein the second input device comprises a display for displaying information.

11. The scanner of claim 9 wherein the display is a liquid crystal display (LCD).

12. The scanner of claim 10 wherein the display is a liquid crystal display (LCD).

13. The scanner of claim 1 wherein the first control board comprises at least a first input/output (I/O) port for providing electrical connection of the first input device with the first control board, and the second control board comprising at least a second I/O port for providing electrical connection of the second input device with the second control board.

14. The scanner of claim 13 wherein both the first I/O port and the second I/O port are serial cable outlets for electrically connecting to a serial cable, the first control board, and the second control board using the serial cable to control operations of the scanner.

15. The scanner of claim 13 further comprising a second signal outlet, wherein the housing comprises a sunken socket, the second signal outlet positioned inside the sunken socket, and the first I/O port and the second I/O port comprise a plurality of pins, the pins capable of being inserted into the second signal outlet so that the first I/O port and the second I/O port connect, respectively, with the second signal outlet.

16. The scanner of claim 15 further comprising a covering for capping the sunken socket of the housing, the first control board or the second control board being disposed between the covering and the housing.

* * * * *